United States Patent

[11] 3,625,985

[72] Inventor Carl Peter Krimmel
    Wauconda, Ill.
[21] Appl. No. 727,698
[22] Filed May 8, 1968
[45] Patented Dec. 7, 1971
[73] Assignee G. D. Searle & Co.
    Chicago, Ill.
    Continuation-in-part of application Ser. No. 467,749, June 28, 1965, now abandoned. This application May 8, 1968, Ser. No. 727,698

[54] ADAMANTANECARBOXAMIDOALKANOIC ACIDS AND RELATED COMPOUNDS
5 Claims, No Drawings

[52] U.S. Cl. .................................................... 260/404,
    71/67, 260/112.5, 260/326.3, 260/404.5, 260/514 B, 424/177, 424/318, 424/319

[51] Int. Cl. ......................................................... C07c 13/52
[50] Field of Search .......................................... 260/514 F, 404

[56] References Cited
FOREIGN PATENTS
62,068  6/1968  Germany .................. 260/514

Primary Examiner—Lewis Gotis
Assistant Examiner—Robert Gerstl
Attorneys—John M. Brown, John J. Kolano, Elliot N. Schubert, Walter C. Ramm and Helmuth A. Wegner ABSTRACT: The present adamantanecarboxylic acid derivatives of amino acids possess antibiotic activity against a variety of organisms. Thus, they are antibacterial, antiprotozoal, and antialgal agents. The compounds are prepared by the reaction of an adamantanecarbonyl halide, preferably the chloride, with an appropriate amino acid, dipeptide, or polypeptide.

ADAMANTANECARBOXAMIDOALKANOIC ACIDS AND RELATED COMPOUNDS

SUMMARY OF THE INVENTION

The present application is a continuation-in-part of application, Ser. No. 467,749, filed June 28, 1965 now abandoned.

The present invention relates to adamantane- and homoadamantanecarboxamidoalkanoic acids and to amides of such acids with amino acids. Alternately, the present compounds can be considered as adamantanecarbonyl derivatives of amino acids, dipeptides, and polypeptides. Specifically, the present invention relates to compounds having the following general formula

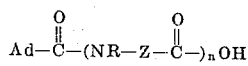

wherein Ad is selected from the group consisting of adamantyl and homoadamantyl with, in each case, the free valence occurring at a bridgehead position; $n$ is a small positive integer with an upper limit of 6; and —NRZ is selected from the group consisting of

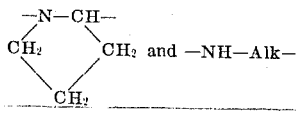

wherein Alk is an alkylene radical.

The alkylene radicals referred to above contain up to 10 carbon atoms and can be exemplified by methylene, ethylene, propylene, trimethylene, tetramethylene, pentamethylene, decamethylene, and the like.

The compounds of this invention are useful because of their antibiotic activity. In particular, they inhibit the growth of bacteria such as *Diplococcus pneumoniae*, protozoa such as *Tetrahymena gelleii* and *Trichomonas fetus* and algae such as *Chlorella vulgaris*. The present compounds can thus be combined with various known excipients and adjuvants in the form of dusts, solutions, suspensions, ointments, and sprays to provide compositions useful for disinfecting purposes. These compounds also inhibit germination of seeds of trifolium.

The compounds of the present invention are conveniently prepared by the reaction of an adamantane-1-carbonyl halide or a homoadamantane-3-carbonyl halide, preferably the chloride, with an appropriate amino acid, dipeptide, or polypeptide. The reaction is carried out in an aqueous solution in the presence of a base such as sodium hydroxide. The compounds in which $n$ in the above formula is greater than 1 can alternately be prepared by the reaction of an acid chloride of the formula

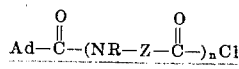

wherein the various groups are defined as above, with an appropriate amino acid, dipeptide, or polypeptide.

The following examples are presented to further illustrate the present invention; they should not be construed as limiting it in spirit or in scope. In these examples, quantities by weight are indicated in grams, quantities by volume are indicated in milliliters, and temperatures are indicated in degrees centigrade (° C.).

EXAMPLE 1

A mixture of 3.0 grams of adamantane-1-carboxylic acid and 20 ml. of thionyl chloride is refluxed on a steam bath for 30 minutes. The mixture is then distilled under reduced pressure to remove excess thionyl chloride. Azeotropically dried benzene is added to the residue and vacuum distillation is resumed to remove the final traces of thionyl chloride. The residual adamantane-1-carbonyl chloride is then dissolved in 100 ml. of dry acetone and the resultant solution is added, in one batch, to a vigorously stirred solution of 1.9 grams of glycine and 2.8 grams of sodium hydroxide in 70 ml. of water. The resultant warm reaction mixture is then heated on a steam bath to remove the acetone. The aqueous solution is then treated with decolorizing charcoal, cooled, and acidified with dilute hydrochloric acid. The solid precipitate which forms is separated by filtration and washed twice with 50 ml. portions of cold water and dried. The solid is then recrystallized from 80 ml. of refluxing 2-butanone to give white crystals of N-(adamantane-1-carbonyl)glycine melting at about 191°–195° C. This compound, at a concentration of 1,000 mcgm./ml., inhibits the multiplication of the organism *Trichomonas fetus*. It has the following formula

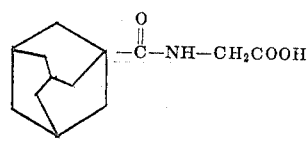

EXAMPLE 2

Homoadamantane-3-carbonyl chloride is prepared from 2.9 grams of homoadamantane-3-carboxylic acid according to the procedure for the preparation of adamantane-1-carbonyl chloride described in example 1. The acid chloride is dissolved in 100 ml. of dry acetone and added in one batch, with stirring at room temperature, to a solution of 1.9 grams of glycine and 2.8 grams of sodium hydroxide in 70 ml. of water. The acetone is removed by heating the mixture on a steam bath and the hot aqueous residue is treated with decolorizing charcoal and filtered. The resultant filtrate is cooled, filtered through diatomaceous earth, cooled in ice, and made acidic with dilute hydrochloric acid. A tacky white precipitate forms and, on standing, becomes a powder. This is separated by filtration, washed with 2 portions of ice water, dried in a steam cabinet, and recrystallized from 2-butanone. The product obtained is analytically pure N-(homoadamantane-3-carbonyl)glycine melting at about 162–184° C.

EXAMPLE 3

The procedure of example 1 is repeated using 2.2 grams of β-alanine in place of the 1.9 grams of glycine. The crude product is recrystallized from 100 ml. of refluxing 2-butanone to give white flaky crystals of N-(adamantane-1-carbonyl)-β-alanine melting at about 178°–183° C.

EXAMPLE 4

2.6 Grams of γ-aminobutyric acid is substituted for the 1.9 grams of glycine and the procedure of example 1. is repeated. The crude product is dissolved in 120 ml. of refluxing acetone and the resultant solution is treated with decolorizing charcoal and then cooled in an ice bath. The solid which precipitates is separated by filtration and then dried to give white crystals of N-(adamantane-1-carbonyl)-γ-aminobutyric acid melting at about 158°–162° C. This compound, at a concentration of 1,000 mcgm./ml., inhibits the multiplication of the organism *Trichomonas fetus*.

EXAMPLE 5

The acid chloride from 4.0 grams of adamantane-1-carboxylic acid is reacted with a solution of 2.9 grams of ω-aminocaproic acid and 3.8 grams of sodium hydroxide in 95 ml. of water according to the procedure described in example 1. The crude final product is obtained as a tacky white gum which solidifies on standing. This solid is washed with water and then air dried before it is dissolved in 30 ml. of 2-butanone. The resultant hot solution is filtered through decolorizing charcoal and infusorial earth. The solution is then concentrated, seeded, and cooled. The solid which forms is separated to give N-(adamantane-1-carbonyl)-ω-aminocaproic acid melting at about 104°–120° C. This compound has the following formula

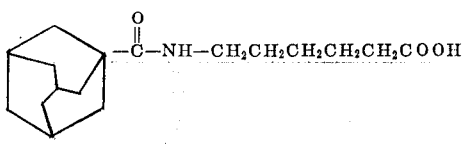

EXAMPLE 6

A solution of 8.0 parts of adamantane-1-carbonyl chloride in 200 ml. of dry acetone is added in one batch, with vigorous stirring at room temperature, to a solution of 10.1 grams of 11-aminoundecanoic acid, 7.6 grams of sodium hydroxide, and 200 ml. of distilled water. The mixture is heated on a steam bath to remove the acetone and the aqueous residue is cooled in ice and acidified with dilute hydrochloric acid. The precipitate which forms is separated by filtration, dried in a steam cabinet, and recrystallized from 2-butanone to give N-(adamantane-1-carbonyl)-11-amino-undecanoic acid melting at about 122°–127° C. This compound has the following formula

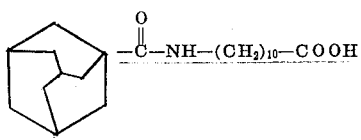

EXAMPLE 7

The acid chloride from 4.0 grams of adamantane-1carboxylic acid is reacted with a solution of 4.4 grams of N-glycylglycine and 5.3 grams of sodium hydroxide in 130 ml. of water according to the procedure described in example 1. The aqueous solution obtained after evaporation of the acetone is acidified with dilute hydrochloric acid. The precipitate which forms is separated by filtration and the filtrate is concentrated under reduced pressure at room temperature. The crystalline product which forms in the concentrated filtrate is separated by filtration. It is N-[N-(adamantane-1-carbonyl)glycyl]glycine and it melts at about 161°–169° C. This compound, at a concentration of 1,000 mcgm./ml., inhibits the multiplication of the organism Trichomonas fetus. It has the following formula

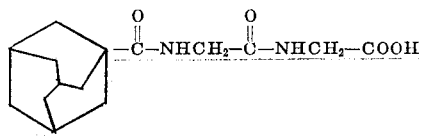

EXAMPLE 8

Adamantane-1-carbonyl chloride is prepared from 3.6 grams of adamantane-1-carboxylic acid according to the procedure described in example 1. The acid chloride is dissolved in 100 ml. of dry acetone and it is added in one batch, with vigorous stirring at room temperature, to a solution of 5.0 grams of N-(N-glycylglycyl)glycine and 8.4 grams of sodium bicarbonate in 150 ml. of distilled water. After the initial foaming subsides, the reaction mixture is heated on a steam bath to evaporate the acetone. The aqueous residue is then cooled, filtered through diatomaceous earth and acidified with dilute hydrochloric acid. The precipitate which forms is separated by filtration, washed with water, and dried, and the dried product is refluxed with 300 ml. of 2-butanone. Partial solution takes place and the resulting hot suspension is filtered. The filtrate is concentrated to half the original volume and cooled to room temperature. It is then filtered again and, on further standing, a microcrystalline precipitate forms. This is separarated by filtration to give N-{N-[N-(adamantane-1-carbonyl)glycyl]glycyl}glycine. This compound has a melting point of about 184°–193° C. and it has the following formula

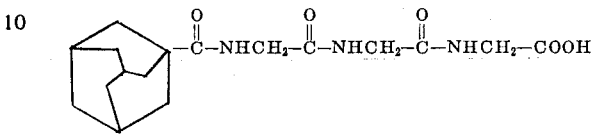

EXAMPLE 9

7.3 Grams of adamantane-1-carboxylic acid is converted to adamantane-1-carbonyl chloride by the procedure described in example 1. The acid chloride is dissolved in 250 ml. of dry acetone and this solution is added, with stirring, to a solution of 6.9 grams of L-proline and 15.1 grams of sodium bicarbonate in 175 ml. of water. When the initial foaming subsides, the reaction mixture is heated on a steam bath to evaporate the acetone. The hot solution is then treated with charcoal, filtered through diatomaceous earth, cooled to room temperature and then in an ice bath, and acidified with dilute hydrochloric acid. The precipitate which forms is separated by filtration and washed with water until the washings are free of acid. The solid material is then dried in a steam cabinet, dissolved in hot benzene, and filtered hot. The resultant solution is cooled and the precipitate which forms is separated by filtration to give N-adamantane-1-carbonyl-L-proline melting at about 185°–190° C.; $[\alpha]_D^{25°}$ $^c$=−125° in chloroform ($c$=1.001 percent). This compound has the following formula

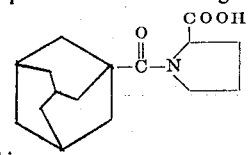

What is claimed is:
1. A compound of the formula

wherein Ad is selected from the group consisting of adamantyl and homoadamantyl; and Alk is alkylene containing up to 10 carbon atoms.

2. A compound according to claim 1 which has the formula

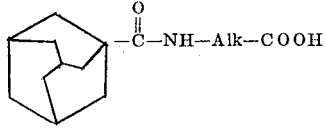

wherein Alk is alkylene containing up to 10 carbon atoms.

3. A compound according to claim 1 which is N-(adamantane-1-carbonyl)glycine.

4. A compound according to claim 1 which is N-(adamantane-1-carbonyl)-β-alanine.

5. A compound according to claim 1 which is N-(adamantane-1-carbonyl)-11-aminoundecanoic acid.

* * * * *